United States Patent [19]
Strohecker et al.

[11] Patent Number: 6,100,896
[45] Date of Patent: Aug. 8, 2000

[54] SYSTEM FOR DESIGNING GRAPHICAL MULTI-PARTICIPANT ENVIRONMENTS

[75] Inventors: Carol Strohecker, Cambridge, Mass.; Barbara Barros, Madison, Conn.

[73] Assignee: Mitsubishi Electric Information Technology Center America, Inc., Cambridge, Mass.

[21] Appl. No.: 08/822,011

[22] Filed: Mar. 24, 1997

[51] Int. Cl.[7] .................................................. G06T 15/20
[52] U.S. Cl. ........................ 345/427; 345/425; 345/429; 345/433
[58] Field of Search ................................... 345/419, 425, 345/427, 429, 433

[56] References Cited

U.S. PATENT DOCUMENTS

| | | | |
|---|---|---|---|
| 5,729,471 | 3/1998 | Jain et al. | 345/425 |
| 5,736,990 | 4/1998 | Barrus et al. | 345/433 |
| 5,751,289 | 5/1998 | Myers | 345/419 |

*Primary Examiner*—Mark K. Zimmerman
*Assistant Examiner*—Kimbinh T. Nguyen
*Attorney, Agent, or Firm*—Dirk Brinkman

[57] ABSTRACT

A system for generating a virtual reality environment applies principles of urban planning. Participants interact with the system by designating or changing certain objects or characteristics of the environment. The environment includes designation of districts having similar scenic characteristics. Paths define routes through the districts and within the environment. Specific foci or landmarks can be identified at locations within the environment. In addition to creating a conceptual view of the environment, the system generates a set of scenes representing movement of a participant along a defined walkway through the environment. The scenes are generated as composite images of objects in a perspective view. The objects forming a composite in the scene are determined based upon the characteristics of the district to which the scene applies.

30 Claims, 2 Drawing Sheets

SYSTEM FOR DESIGNING GRAPHICAL MULTI-PARTICIPANT ENVIRONMENTS

FIELD OF THE INVENTION

This invention relates to a system for designing a graphical environment, such as a computerized virtual reality location. More particularly, it relates to a system for designing a graphical environment with multiple creators and participants.

BACKGROUND OF THE INVENTION

Virtual reality systems present images to a user representing scenes at a location, either real or imaginary. In such a system, the user may move around the location or take actions which alter the scene. For example, in an outdoor location, the user may move down a street or path passing buildings, trees, and other objects. The scene changes as the user moves. The user may turn to face different directions which also causes the scene to change. The user may also move or pick up objects. One of the difficulties for a creator of a virtual reality system is the need to create a large number of scenes with different characteristics. Typically, this is done by specifying the objects (such as buildings, trees, vehicles, etc.) at each location.

Often virtual reality systems have multiple participants. The participants move around in the location and interact with each other. Typically, the participants have different goals, objectives, and expectations about the virtual reality location.

The design of the location must account for these differences. In order to provide greater diversity, the system creator may allow the participants to assist in generating portions of the location, with corresponding characteristics. Creation by multiple participants raises additional problems of integration and joint operation.

Lucasfilm Games created a system called "Habitat" which is a multi-user, on-line simulated world. The operations and problems with this world are discussed in C. Morningstar and F. R. Farmer, "The Lessons of Lucasfilms', Habitat" *Cyberspace: First Steps* (ed. M. Benedikt, 1991). In this system, online participants see views of a world with characters representing themselves and other participants acting within the world. One of the difficulties for Habitat was the creation of a world capable of supporting a population of thousands or tens of thousands of participants. The creators of Habitat tried to centrally plan and generate the entire world. With large numbers of participants, the world had to be large and to include things to do which would be of interest to the various participants. This required the design of many buildings, road networks, objects, and areas. Furthermore, in order to generate interest, the designs had to be diverse. Respective designs and architectures are uninteresting in the real world and in virtual reality. This proved to be extremely difficult for the central planner. Thus, a need exists for a system which allows the creation of a large scale virtual reality environment with diversity.

Urban planners have used systems which describe locations in general terms. *The Image of the City* (1960) by Kevin Lynch describes five elements that people use to organize a mental image of a city or region. "Districts" are broad regions, such as neighborhoods, which have some common identifying character. "Paths" are channels, such as roads or walkways, along which an observer can move. "Edges" are boundaries between districts. "Nodes" are specific objects to and from which an observer may travel. Finally, "landmarks" are points used for general orientation, locally or globally. While these constructs are used for understanding, describing, and designing real-world cities or other locations, they have not been used for designing places in virtual reality environment.

Therefore, a need exists for a system to allow generation of a virtual reality location by multiple participants. A need also exists for a system which provides structure to the virtual reality environment. A need also exists for a system which allows for diversity in the creation of the environment.

SUMMARY OF THE INVENTION

The present invention overcomes the deficiencies of the prior art by providing a system for creation of a graphical environment, such as a virtual reality location, through application of urban planning constructs. The environment is created by defining districts, paths, edges, nodes, and landmarks within the environment. The districts are further defined by the characteristics which represent that district, such as the types and styles of objects within the district. Scenes provided to a participant moving within the environment are generated, based upon the characteristics of the districts within the environment. In particular, the participant moves along defined walkways, which may or may not include specific designated paths, through the environment. At positions along the walkway, scenes are developed based upon stored images representing characteristics within each district or representing the different nodes and landmarks.

DETAILED DESCRIPTION

Figure 1:
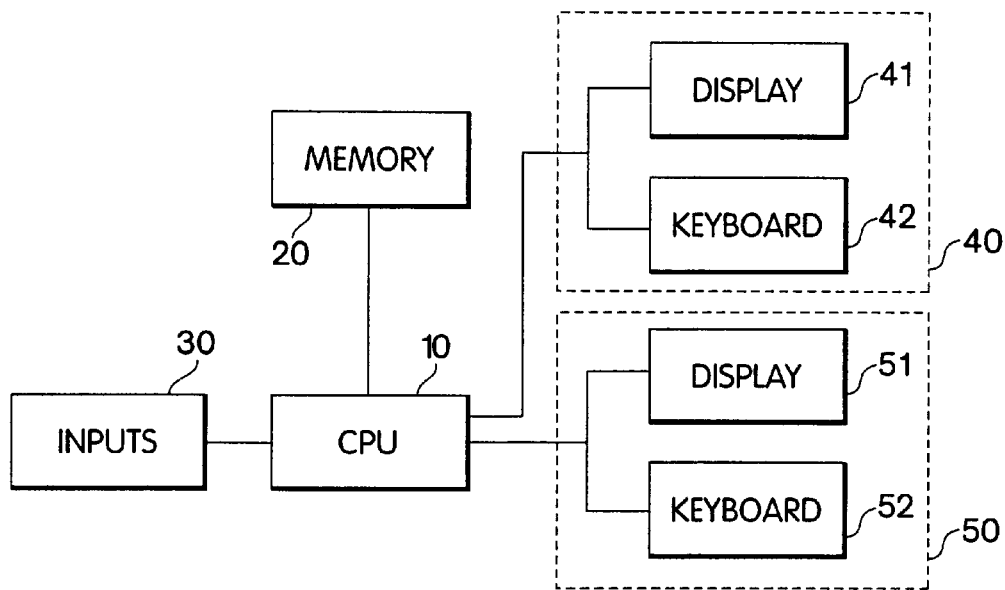
FIG. 1 is a block diagram computer system which can be used in the system of the present invention.

The present invention may be implemented using a computer system, such as the system illustrated in block diagram form in FIG. 1, for creating, storing, and changing the graphical environment, and generating scenes of the environment. A CPU 10 processes instructions stored in a memory 20 in order to perform the functions of the system. Users or participants each have a terminal 40, 50 for connecting to the CPU 10. Each user terminal may include a separate computer, which performs part of the processing. At a minimum, each terminal includes an input device, such as keyboard 42, 52, and an output device, such as display 41, 51, for interacting with the system. Of course, other types of input and output devices can be used. A separate input port 30 may be connected to the CPU to input data used by the system. The inputted data may include designs of the environment, or specific elements to be used in developing a scene within the environment. The memory 20, which can be one or more of various kinds, including RAM, ROM, CD-ROM, and combinations, must be of sufficient size to store both the instructions for operating the CPU and the data for generating the environment and scenes from the environment. Of course, multiple, different memories can be used for storing data, rather than a single memory as illustrated in FIG. 1.

Figure 2:
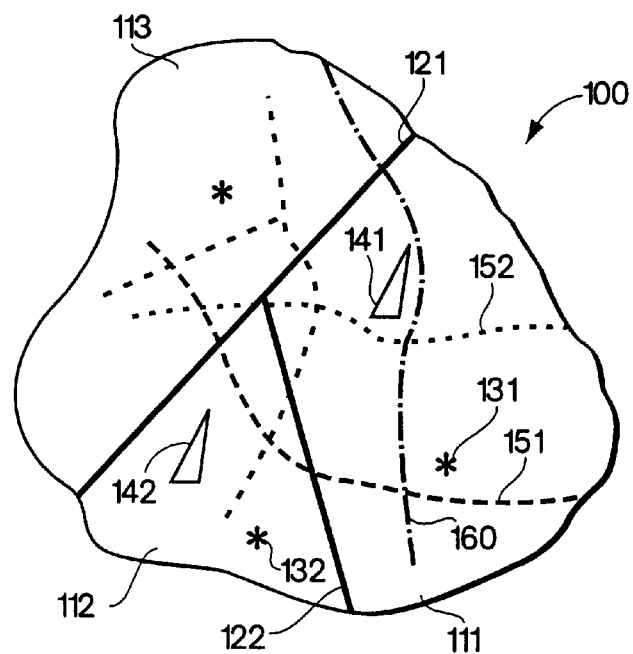
FIG. 2 illustrates a graphical depiction of an environment created using the system of the present invention.

FIG. 2 illustrates the design of an environment using the system of the present invention. As illustrated, the environment is designed using the five elements identified by Lynch in describing an image of a city. The participants or creators add to the environment by selecting and placing these elements at different locations within the environment. When modifying the environment, a view of the environment, as illustrated in FIG. 2, is displayed on the user's display 41. Using the keyboard 42, or other input device, the user selects specific elements and places them within the environment on the display. The user may also enter characteristics of the element. In particular, the actual objects which are the nodes and landmarks need to be identified. As illustrated in FIG. 2, the environment 100 includes districts 111, 112, 113. Each district has certain boundaries and characteristics which are used for generating the scenes within the environment. The edges or boundaries 121, 122 divide districts and represent locations for changes between characteristics in the different areas. Of course, an edge does not need to be specifically identified, since the locations of districts identify the boundaries between them. Nodes 131, 132 represent different foci, such as specific buildings or other locations within the environment. Landmarks 141, 142 also represent specific elements within the environment, such as mountains or recognizable buildings. The paths 151, 152 are illustrated as passing throughout the districts within the environment. Finally, a walkway 160 is defined within the environment which represents the progression of one of the participants through the environment. A walkway is not one of the urban planning constructs. Instead, it is used to generate the scenes in the virtual reality environment.

Figure 3:
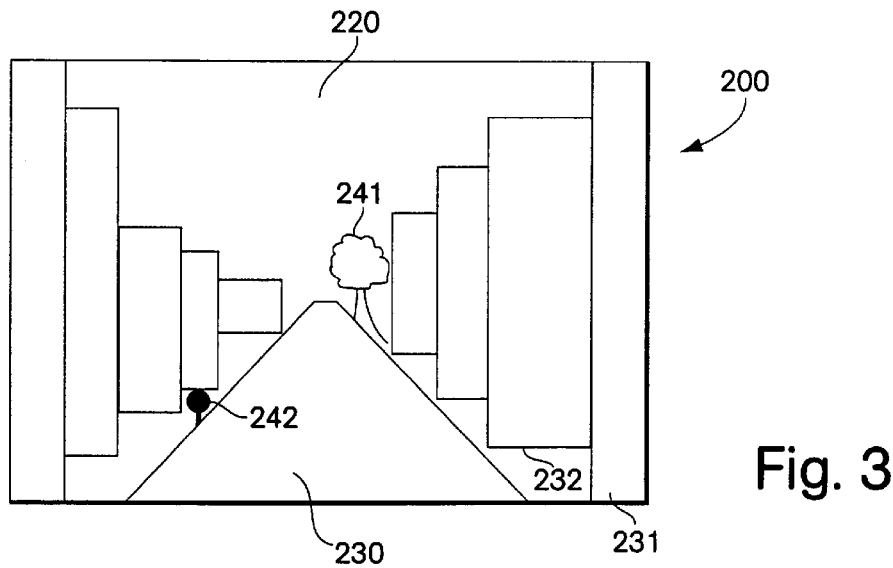
FIG. 3 represents a street level scene of the present invention.

Once the environment is created and a walkway for a participant has been laid out, the system generates a set of scenes representing movement along the walkway through the environment. An example of the format for a scene is illustrated in FIG. 3. While FIG. 2 represents a conceptual "birdseye" view of the environment, the scenes represent a ground level view at specific locations along the walkway. In essence, the scenes represent a transformation from a conceptual city view to a specific human view of the structural elements which are part of the environment. As illustrated in FIG. 3, the scenes may be a perspective view of composited objects. These objects can include the ground 210, the sky 220, facades of buildings 231, 232 and specific freestanding objects, such as a tree 241 or parking meter 242. Of course, with more sophisticated rendering systems, the scene may be developed as actual 3D images of specific objects, positioned along the walkway.

Diversity in the environment is achieved by selecting specific characteristics representing each of the districts, in addition to the specific nodes and landmarks created within the environment. The characteristics of a district may define the types of structures which exist along a walkway. For example, a district may have certain types of buildings (wood-clapboard triple deckers), certain types of paths, (asphalt roadways with brick lined sidewalks), and specific objects (trees, fire hydrants, parking meters) along the route. As these scenes develop representing movement along the walkway, the objects within the scene are based upon the characteristics of the district to which the scene corresponds. As the participant moves along the walkway into another district, the flavor of the scenes change. The objects in the scenes are revised to reflect the new characteristics of the new district. While the districts have been discussed as locations within a city, the environment is not limited to a city. The districts may also represent natural areas having common characteristics such as parks, wilderness areas, mountains, bodies of water, or other types of areas which might be encountered by a specific observer.

Figure 4:
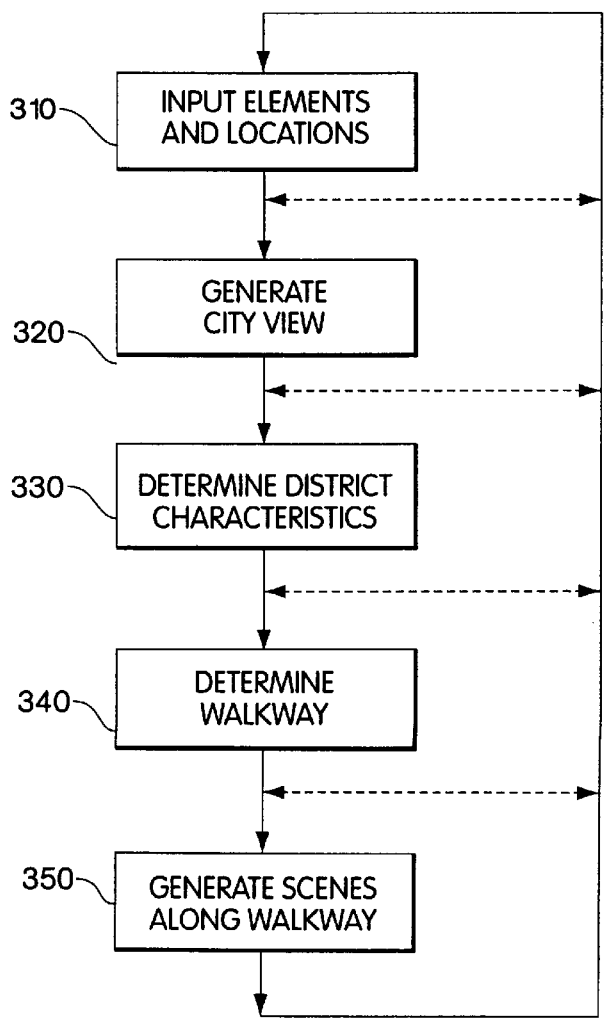
FIG. 4 is a block diagram representing the steps in operation of the present invention.

FIG. 4 illustrates, in a block diagram format, the functions performed by the present invention. The first three steps 310, 320, 330 relate to generation of the conceptual view of the environment. At step 310, a user inputs specific elements and their location within the environment. In addition to defining the element and their locations, the user may need to include data defining the view of the element.

Once the elements have been selected and located, the system generates a conceptual view of the city (step 320). This view is represented in FIG. 2.

In order for a user to operate within the environment, a walkway must be determined through the environment. This walkway may be preplanned, such as illustrated by walkway 160 in FIG. 2, or may be revised in real-time as the participant interacts with the environment. Certain characteristics of the different districts are pre-defined and stored in an adjunct database. The district characteristics are identified in step 330. As discussed above, the characteristics for district identify the types of objects and the looks of the objects which are encountered within that district. Finally, at step 350, the system generates scenes encountered along the walkway. The scenes are generated based upon the characteristics of the district in which each scene is located within the environment. As illustrated in FIG. 4, the system of the present invention does not require a straight progression through each of the steps 310–350. Rather, from any step the user can proceed through any other step in order to change the environment or revise the walkway through the environment.

Having now described a few embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention as defined by the appended claims.

What is claimed is:

1. A computer system for generating an environment comprising:

input means for receiving data including a plurality of districts defining areas in said environment representing elements in the environment and their locations;

characteristic receiving means for receiving characteristics for each of said districts which distinguish one district from another district;

concept generation means for generating a conceptual representation of the environment;

transformation means for transforming said conceptual representation to at least one scene representing a view of the environment at a specified location within one of the plurality of districts; and a display for displaying said at least one scene with the represented elements automatically having the received characteristics of the one district.

2. The computer system of claim 1, wherein said input means includes a plurality of user input means, each of the user input means receiving data from one of a plurality of users.

3. The computer system of claim 1, wherein said data includes edges defining boundaries between districts.

4. The computer system of claim 1, wherein said transformation means transforms said conceptual representation to the at least one scene based upon the characteristics of the one district including the specified location.

5. The computer system of claim 1, wherein said characteristics include types of objects present in each district, and wherein said at least one scene includes objects of types corresponding to a district including the specified location.

6. The computer system of claim 1, wherein said data includes a plurality of nodes defining objects at node locations in said environment; and wherein said at least one scene includes a representation of at least one node, when the specified location is near a node location corresponding to said at least one node.

7. The computer system of claim 1, wherein said transformation means includes:

means for identifying objects at the specified location; and means for creating a perspective view compositing representations of the identified objects.

8. The computer system of claim 1, further comprising walkway definition means for defining a walkway in said environment; and wherein said transformation means includes means for transforming said conceptual representation to a series of scenes representing views at a series of specified locations along the walkway.

9. The computer system of claim 8, wherein said walkway definition means includes means for receiving a user input identifying a portion of a walkway while at least one scene is being displayed.

10. The computer system of claim 8, wherein said data includes a plurality of paths in said environment, and wherein at least a portion of said walkway coincides with at least a portion of one path.

11. A method for generating a virtual reality environment comprising the steps of:

receiving user input data representing elements in the environment and corresponding locations;

receiving district data for a plurality of non-overlapping districts in the environment;

receiving characteristic data corresponding to each of the districts;

automatically associating the received characteristic data corresponding to each district to the elements having locations in that district based upon said elements having locations within that district;

displaying a conceptual representation of the environment with each element being represented at a corresponding location;

generating at least one scene representing a view of the environment at a specified location based upon the displayed conceptual representation and with the elements within the scene having characteristics determined by the characteristic data associated with those elements; and displaying the at least one scene.

12. The method of claim 11, wherein said receiving step includes receiving user input data from a plurality of users.

13. The method of claim 11, wherein said receiving step includes the steps of receiving edge data defining boundaries between districts.

14. The method of claim 11, wherein said at least one scene has characteristics corresponding to a district which includes said specified location.

15. The method of claim 11, wherein said generating step includes the steps of:

identifying objects at the specified location; and compositing representations of the identified objects in a perspective view.

16. The method of claim 11, wherein said generating step includes the step of generating a series of scenes at a series of adjacent locations.

17. The method of claim 16, wherein said generating step further includes receiving at least one user input identifying a subsequent adjacent location in the series.

18. A method of creating a graphical environment, comprising the steps of:

defining at least two districts within a graphical environment;

defining first characteristics of objects for a first of the defined at least two districts and second characteristics of the objects, different than the first characteristics, for a second of the defined at least two districts;

locating an object within the defined first district and within the defined second district;

automatically associating the object located within the defined first district with at least one of the first characteristics based on the object being located in the first district and the object located within the defined second district with at least one of the second characteristics based on the object being located in the second district; and creating a graphical environment with the object located within the first district having the associated at least one of the defined first characteristics and the object located within the second district having the associated at least one of the defined second characteristics.

19. A method according to claim 18, wherein:

the first characteristics include at least one of first types of the objects and first styles of the objects within the first district; and the second characteristics include at least one of second types of the objects, different than the first types of the objects, and second styles of the objects, different than the first styles of the objects, within the second district.

20. A method according to claim 18, further comprising the step of:

defining a walkway for movement of a participant within the first district and within the second district;

generating scenes with the object having the at least one of the defined first characteristics while the participant is moving along the defined walkway within the first district; and generating scenes with the object having the at least one of the defined second characteristics while the participant is moving along the defined walkway within the second district.

21. A method according to claim 18, further comprising the steps of:

locating other objects within the first district;

locating the other objects within the second district;

automatically associating the other objects within the first district with the defined first characteristics based on the other objects being located within the first district;

automatically associating the other objects within the second district with the defined second characteristics based on the other objects being located within the second district;

generating a first scene depicting the other objects located in the first district having the defined first characteristics; and generating a second scene depicting the other objects located in the second district having the defined second characteristics.

22. A method according to claim 18, wherein:

the object is a building;

the object having the at least one of the defined first characteristics is a first style building; and the object having the at least one of the defined second characteristics is a second style building.

23. A method according to claim 18, wherein:

the object is a tree;

the object having the at least one of the defined first characteristics is a first type tree; and the object having the at least one of the defined second characteristics is a second type tree.

24. A method according to claim 18, wherein the objects include at least one of manmade objects and natural objects.

25. A graphical environment system, comprising:

a memory configured to store (i) a first graphical environment district and associated first characteristics, (ii) a second graphical environment district, different than the first graphical environment district, and associated second characteristics, different than the first characteristics, and (iii) graphical objects; and a processor configured to receive an input to locate the graphical objects within the first graphical environment district, to receive an input to locate the graphical objects within the second graphical environment district, to automatically apply the first characteristics to the graphical objects located within the first graphical environment district based on the graphical objects being located in the first graphical environment district, to automatically apply the second characteristics to the graphical objects located within the second graphical environment district based on the graphical objects being located in the second graphical environment district, to generate scenes depicting the graphical objects within the first graphical environment district, with the graphical objects having the first characteristics, and to generate scenes of the graphical objects within the second graphical environment district, with the graphical objects having the second characteristics.

26. A system according to claim 25, wherein:

the stored first characteristics include at least one of first types of graphical objects and first styles of graphical objects associated with the first graphical environment district; and the stored second characteristics include at least one of second types of graphical objects, different than the first types of graphical objects, and second styles of graphic objects, different than the first styles of graphical objects, associated with the second graphical environment district.

27. A system according to claim 25, wherein the processor is further configured to:

receive an input defining a walkway for movement of a participant within the first graphical environment district and within the second graphical environment district;

automatically generate the scenes of the graphical objects located within the first graphical environment district, with the graphical objects having the first characteristics, while the participant is moving along the walkway defined within the first graphical environment district; and automatically generate the scenes of the graphical objects located within the second graphical environment district, with the graphical objects having the second characteristics, while the participant is moving along the walkway defined within the second graphical environment district.

28. A system for creating a graphical environment, comprising:

a memory configured to store a first graphical environment district and associated first characteristics, a second graphical environment district and associated second characteristics, and graphical objects; and a processor configured to process a first input directing a first of the graphical objects be located in the first graphical environment district, to apply the first characteristics to the first object based on the first object being located in the first graphical environment district, and to generate a first scene having the first object with the first characteristics, and to process a second input directing the first object be located in the second graphical environment district, to apply the second characteristics to the first object based on the first object being located in the second graphical environment district, and to generate a second scene having the first object with the second characteristics.

29. A system according to claim 28, wherein:

the stored first characteristics include at least one of first types of the stored graphical objects and first styles of the stored graphical objects associated with the first graphical environment district; and the stored second characteristics include at least one of second types of the stored graphical objects, different than the first types of the stored graphical objects, and second styles of the stored graphic objects, different than the first styles of the stored graphical objects, associated with the second graphical environment district.

30. A system according to claim 28, wherein the processor is further configured to:

receive an input defining a walkway for movement of a participant within the first graphical environment district and within the second graphical environment district;

generate the first scene while the participant is moving along the defined walkway within the first graphical environment district; and generate the second scene while the participant is moving along the defined walkway within the second graphical environment district.

* * * * *